(12) United States Patent
Thiel et al.

(10) Patent No.: US 9,747,133 B2
(45) Date of Patent: Aug. 29, 2017

(54) ENHANCED AVAILABILITY FOR MESSAGE SERVICES

(75) Inventors: Greg Thiel, Black Diamond, WA (US); Manoharan Kuppusamy, Redmond, WA (US); Mihai R. Jalobeanu, Sammamish, WA (US); Yogesh Bansal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 13/529,869

(22) Filed: Jun. 21, 2012

(65) Prior Publication Data

US 2013/0346512 A1    Dec. 26, 2013

(51) Int. Cl.
  *G06F 15/16*    (2006.01)
  *G06F 9/50*    (2006.01)
  *G06F 11/34*    (2006.01)
  *G06F 11/20*    (2006.01)

(52) U.S. Cl.
  CPC ............ *G06F 9/5011* (2013.01); *G06F 9/505* (2013.01); *G06F 11/3409* (2013.01); *G06F 11/20* (2013.01); *G06F 2209/503* (2013.01)

(58) Field of Classification Search
  CPC ..... G06Q 10/107; G06F 15/16; H04L 12/585; H04L 12/58
  USPC ........................................................ 709/206
  See application file for complete search history.

(56) References Cited

U.S. PATENT DOCUMENTS

| | | | |
|---|---|---|---|
| 6,654,910 B1 | 11/2003 | Eibach et al. | |
| 7,246,256 B2 | 7/2007 | De La Cruz et al. | |
| 2002/0007468 A1 | 1/2002 | Kampe et al. | |
| 2003/0105867 A1 | 6/2003 | Colrain et al. | |
| 2004/0158766 A1 | 8/2004 | Liccione et al. | |
| 2007/0006015 A1 | 1/2007 | Rao et al. | |
| 2008/0049775 A1* | 2/2008 | Morrill et al. | 370/419 |
| 2008/0052401 A1* | 2/2008 | Bugenhagen et al. | 709/227 |
| 2008/0133674 A1* | 6/2008 | Knauerhase et al. | 709/206 |
| 2009/0006526 A1* | 1/2009 | Gingell, Jr. | G06F 9/5055 709/202 |

(Continued)

OTHER PUBLICATIONS

Algirdas Avizienis; "Toward Systematic Design of Fault-Tolerant Systems;" Apr. 1997; pp. 51-58; vol. 30, Issue 4; IEEE; http://www.pld.ttu.ee/IAF0030/avizienis2.pdf.

(Continued)

*Primary Examiner* — Vivek Srivastava
*Assistant Examiner* — Sibte Bukhari

(57) ABSTRACT

An enhanced availability environment for facilitating a message service provided by a plurality of service elements is disclosed herein. The enhanced availability environment comprises a monitoring element and an enhanced availability element. The monitoring element monitors a first service element of the plurality of service elements for a monitored characteristic, generates monitoring information corresponding to the monitored characteristic, and communicates the monitoring information to the enhanced availability element. The enhanced availability element determines an availability of the first service element for the message service based at least in part on the monitoring information and an availability characteristic of the first service element, and communicates the availability to initiate an availability action.

20 Claims, 4 Drawing Sheets

(56) References Cited

U.S. PATENT DOCUMENTS

2011/0154092 A1    6/2011  Dash et al.

OTHER PUBLICATIONS

Helene Grosch, et al.; "Cúram Business Application Suite on IBM System Z;" IBM Redbooks; Jul. 2009; pp. 1-312; IBM; www.redbooks.ibm.com/redbooks/pdfs/sg247715.pdf.
Sanjay Ghemawat, et al.; "The Google File System;" SOSP 2003 proceedings of the nineteenth ACM symposium on operating systems principles; Oct. 2003; pp. 1-15; http://www.cs.brown.edu/courses/cs295-11/2006/gfs.pdf.

* cited by examiner

ENHANCED AVAILABILITY FOR MESSAGE SERVICES

TECHNICAL FIELD

Aspects of the disclosure are related to computing and communications, and in particular to enhanced availability for message services.

TECHNICAL BACKGROUND

Message services are increasingly depended upon by users to handle their vital communications, such as email, telephony, and video communications. Monitoring and availability solutions are often employed to meet user expectations that a message service be both highly reliable and highly available. Monitoring and availability solutions work to keep the service elements that provide a message service functioning properly. In this manner, users are able to enjoy convenient and ubiquitous access to their messaging.

Monitoring solutions typically function to monitor the performance or health of a message service or the systems and sub-systems that provide the message service. Monitored characteristics of a service element, such as a process or machine supporting the message service, are reported, and when necessary, steps are taken to rectify shortcomings of the service element. For example, disk capacity, processor load, and other aspects related to the health of the service element can be monitored and upgrades or maintenance scheduled to improve the performance of the service element.

In contrast, availability solutions function to provide more immediate responses to critical performance aspects, such as detecting inoperative service elements and responsively initiating operations to keep a message service available. For example, should a service element fail entirely, an availability solution can ensure that a failover occurs to another service element that is available to take the place of the failed service element in providing an aspect of a message service. In addition, the availability solution may attempt to recover and restore the failed service element to the message service.

OVERVIEW

Provided herein are systems, methods, and software that provide enhanced availability for message services. In particular, an enhanced availability process is provided that considers not only availability characteristics of a service element, but also monitoring information generated by monitoring processes. The resulting enhanced availability improves the user experience by initiating availability actions both in response to availability characteristics, such as the operative state of a service element, but also in response to conditions indicated by the monitoring information, such as disk capacity or processor load.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations described herein provide for the enhanced availability of message services. Health characteristics and other performance aspects of a service element are monitored and corresponding monitoring information is supplied to an enhanced availability process. The enhanced availability process is capable of determining the availability of the service element based on availability characteristics associated with the service element, but also based on the monitoring information. Availability actions can be initiated, such as a failover, removal, restoration, or recovery processes. In one example, the availability action may be a designation of a passive message database as an active message database in place of a previously active message database.

By integrating monitoring information with availability determinations, the user experience with a message service can be improved. In contrast with past availability solutions, the enhanced availability solutions disclosed herein respond quickly to sub-optimal instances of a message service caused by characteristics that previously may not have been considered for availability purposes.

For example, previous monitoring solutions would note problems with disk capacity or an overburdened processor on a service element and would report those characteristics to an administrative center for maintenance. But those characteristics were not used to drive availability determinations. Rather, end users would be subjected to the sub-optimal experience manifested in many ways, such as delayed responses and inaccessible interfaces, until the maintenance activity triggered by the monitoring was completed.

The enhanced availability solutions discussed herein incorporate monitoring information generated by monitoring processes when making availability determinations. In this manner, more than just the operative state of an element may be considered, thereby providing improved messaging experiences to end users.

Figure 2:
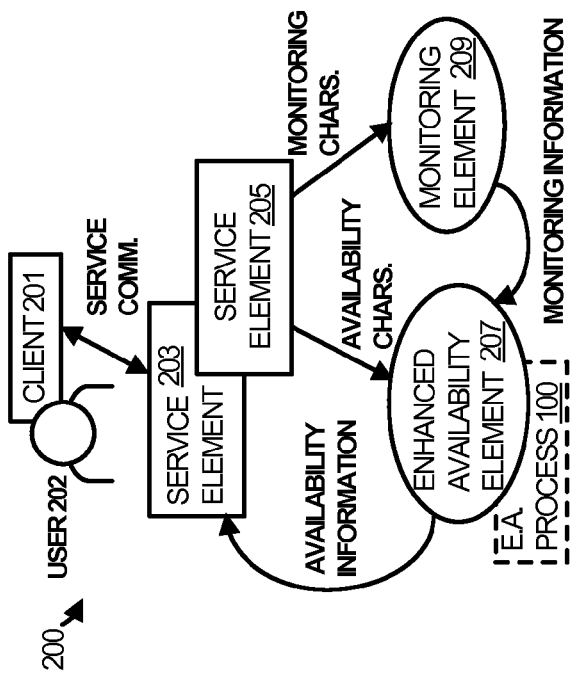
FIG. 2 illustrates an enhanced availability environment in an implementation.
Figure 1:
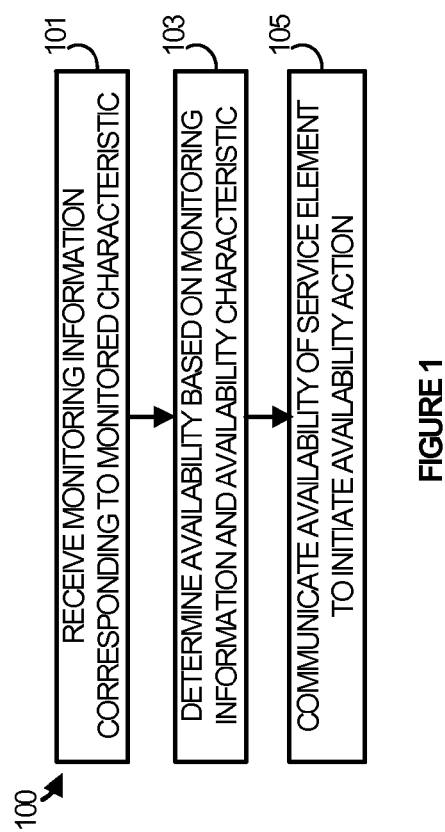
FIG. 1 illustrates an enhanced availability process in an implementation.
Figure 3:
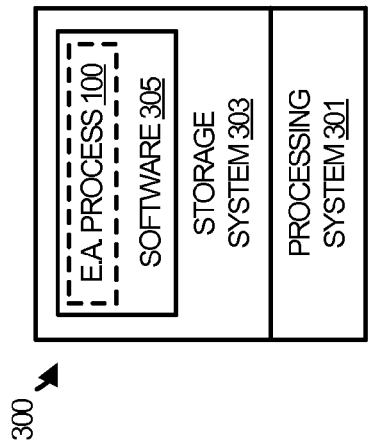
FIG. 3 illustrates a computer system in an implementation.
Figure 5:
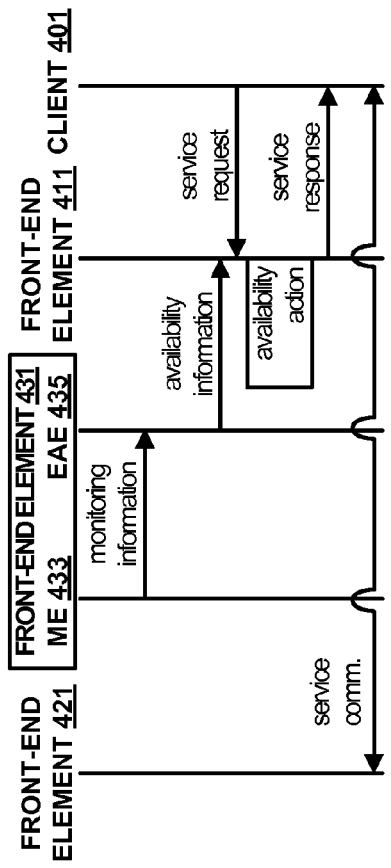
FIG. 5 illustrates an operational sequence in an implementation.
Figure 6:
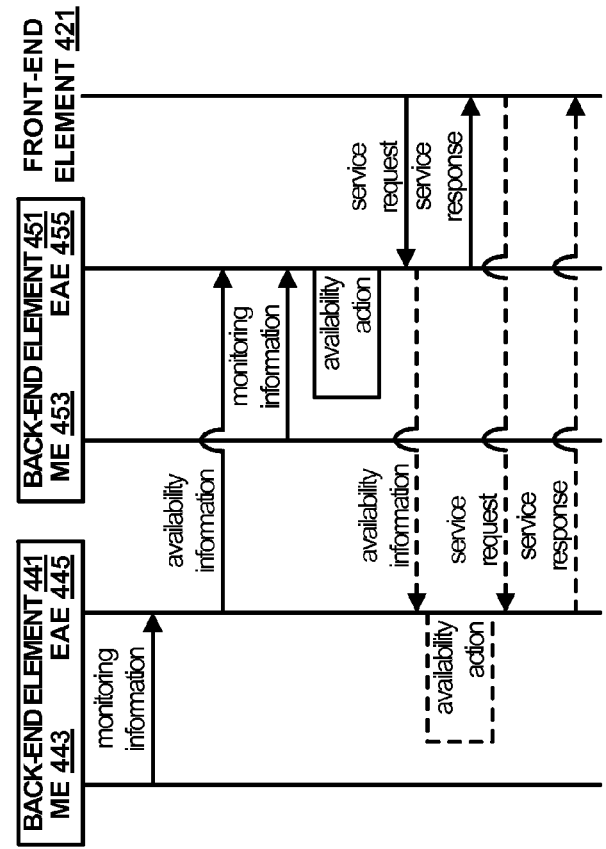
FIG. 6 illustrates an operational sequence in an implementation.
Figure 4:
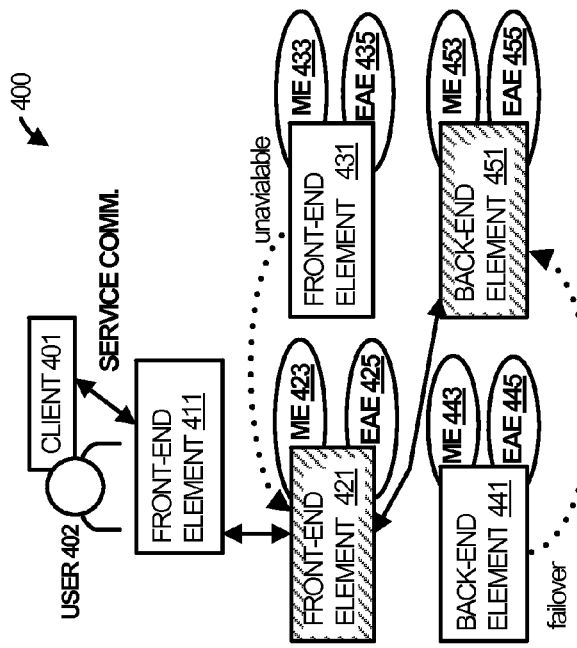
FIG. 4 illustrates an enhanced availability environment in an implementation.
Figure 7:
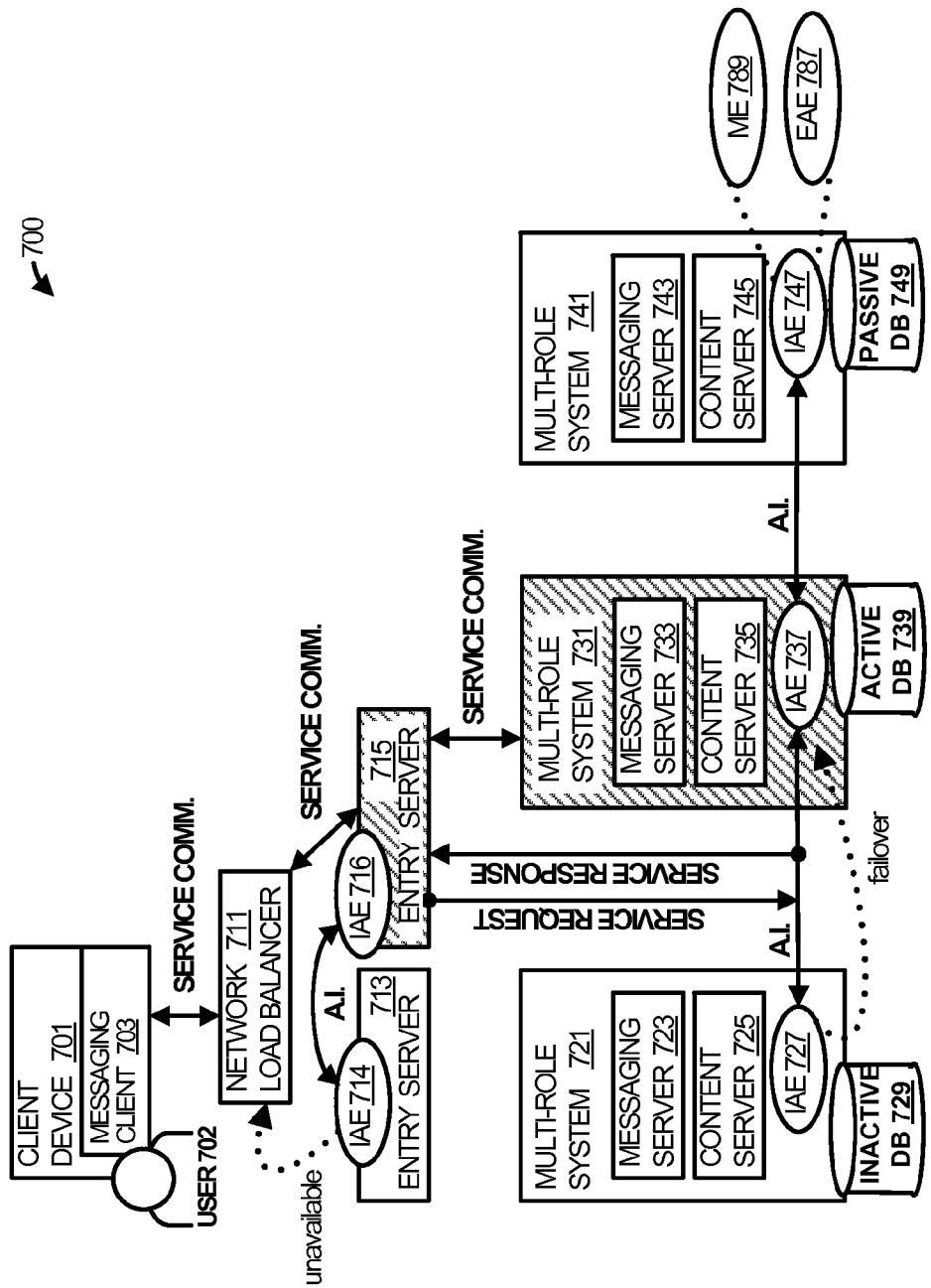
FIG. 7 illustrates an enhanced availability environment in an implementation.
Figure 8:
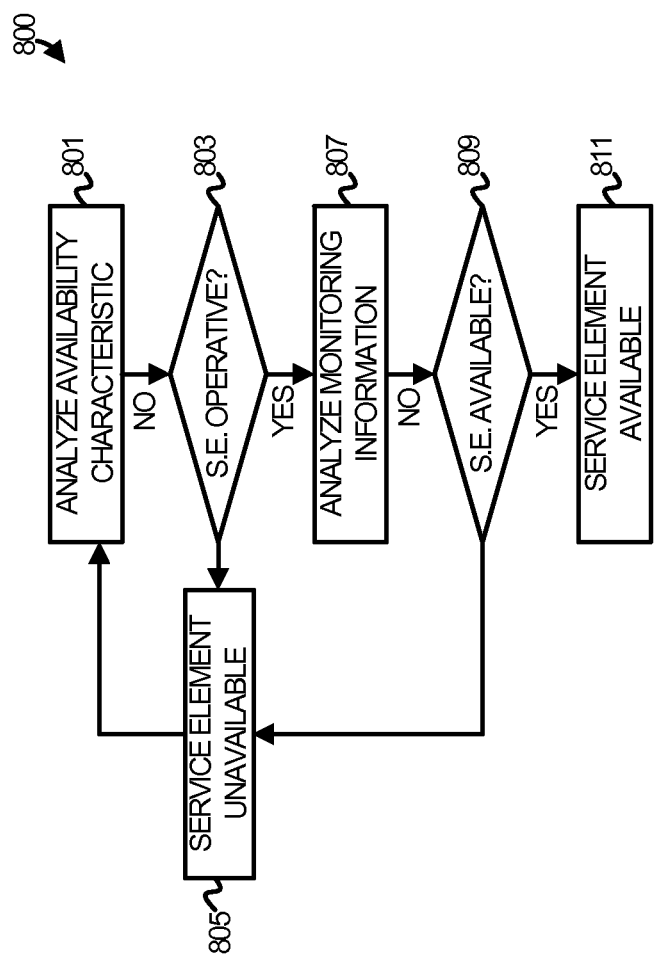
FIG. 8 illustrates an enhanced availability process in an implementation.

Referring now to the drawings, FIGS. 1-3 illustrate an implementation whereby an enhanced availability process is employed to facilitate an improved message service. In particular, FIG. 1 illustrates the steps involved in the enhanced availability process, while FIG. 2 illustrates an exemplary environment in which the enhanced availability process may be employed. FIG. 3 illustrates a computing system suitable for implementing the enhanced availability process in FIG. 1, as well as for implementing many of the elements described with respect to the enhanced availability environments disclosed herein. FIGS. 4-6 illustrate another enhanced availability environment and operational sequences related thereto. FIG. 7 provides yet another environment, but to illustrate one implementation involving an email service, while FIG. 8 illustrates an optional enhanced availability process.

Turning now to FIG. 1, enhanced availability process 200 is illustrated. Enhanced availability process 200 is representative of any process that may be employed in support of the service elements that are deployed within a message service to ensure that the message service is highly reliable and highly available. Enhanced availability process 200 may be implemented as a part of or separate from any of the service elements that provide the message service. Enhanced availability process 200 may also be implemented in computer hardware or software, or any combination thereof, as will be discussed below in more detail with respect to FIG. 3.

Enhanced availability process 200 begins with receiving monitoring information that corresponds to a monitored characteristic of a service element (step 101). It should be understood that more than one monitored characteristic of the service element may be identified by the monitoring information. The monitored characteristics generally pertain to the health of a service element that provides at least an aspect of the message service. Any aspect of a message service may be monitored, including the service level, the user experience, application and database layers, physical and virtual infrastructure, and network infrastructure.

Examples of monitored characteristics include memory utilization, disk capacity, disk transfer rate, processor load, bandwidth, the number of processes running on a physical service element, and power consumption. The monitored characteristics may also pertain to the performance of various logical processes or applications that run in support of a message service. For example, a message server may report on the number of messages sent and received, the size of data stores associated with the message service, as well as other characteristics related to the performance of the message server. Yet other examples include the number of message queues initiated and their duration and the number of connections running.

In some cases, the monitored characteristics are reported to an administrative or operations center so that sub-optimal performance issues can be addressed. For example, the monitored characteristics may be reported to personnel by way of performance graphs, graphical models, and other ways of displaying monitoring information to a user.

Once the monitoring information is generated, the availability of the service element is determined based in part on the monitoring information, but possibly also in view of an availability characteristic associated with the service element (step 103). It should be understood that more than one availability characteristics may be considered when determining the availability of a service element.

Availability characteristics generally pertain to the operational state of a service element, such as whether or not the service element is functioning at all. The availability of a particular service element, such as a hardware or software element that provides an aspect of the message service, can trigger alerts and other actionable events that require relatively immediate attention compared to monitored characteristics.

It should be understood that many other monitored characteristics and availability characteristics are possible and the scope of the implementations discussed herein should not be limited to just those examples given above. Examples of availability characteristics include the operational state of a physical element, a logical element, or any other type of service element. For instance, availability characteristics may indicate whether or not the physical or logical element is operative or inoperative. In other words, a failed service element that is no longer running would be identified by the availability characteristic. Some example events that may affect the availability of a component or service element include power outages, operator error, natural disasters, and other events that may change the operational state of a service element.

The availability of a particular service element generally refers to the level of service that can be provided by that service element. In some implementations, the availability of a service element may be binary—either available or unavailable. For example, in the case of a failed service element, the level of service would be unavailable. In the case of a fully functional service element, the level of service would be totally available.

However, it should be understood that more granular availability measures are also possible. For example, the availability of a service element may be moderately available. Other ways in which to represent more granular levels of availability determined in view of monitoring information are considered herein, such as a numeric scale corresponding to the availability of an element.

The monitoring information corresponding to the monitored characteristic of the service element impacts the availability of the service element determined in step 103. For example, while the availability characteristic associated with the service element may indicate that the service element is operative, the monitoring information may indicate that the health of the service element is only moderately healthy. Thus, the availability of the service element can be determined to be moderately available. Likewise, other availability measures may be arrived at based on the monitoring information. For example, monitoring information that identifies a service element with very low spare disk capacity may correspond to a very low availability state, or even an unavailable state.

By considering monitoring information along with availability characteristics, health issues corresponding to a service element that may ultimately create availability problems can be pre-empted and dealt with earlier. In addition, by factoring monitoring information into the availability determination, end users will be spared the sub-optimal experience of interacting with poorly performing service elements.

The availability of the service element is then communicated to initiate an availability action (step 105). It should be understood that more than one availability action may be initiated. The availability may be communicated to various destinations, such as another enhanced availability element or a service element. The availability action that is initiated may be a variety of responses, such as taking a service element out of service or otherwise removing the service element, initiating a failover from one service element to another, or even maintaining the operational state of the message service. In other words, making no change at all to a service element may itself be considered an availability action.

In addition, determining the availability of another service element based on the previously-determined availability of a different service element may also be considered an availability action. For example, the availability of one service element may be low. This low availability of the first service element can be considered when determining the availability of a second service element that, while possibly experiencing a sub-optimal availability level of moderate, is at least a better option for the message service than the first service element with low availability.

Turning to FIG. 2, enhanced availability environment 200 is illustrated to demonstrate the application of enhanced availability process 100 in one implementation. Enhanced availability environment 200 includes client 201, service element 203, and service element 205. User 202 accesses messaging by way of interaction with client 201. Client 201 exchanges service communications with service element 203, and possibly with service element 205, to provide a message service to user 202.

Service elements 203 and 205 are any type of element capable of providing an aspect of the messaging service. Service elements 203 and 205 may be software or hardware elements, or any combination thereof. For example, service elements 203 and 205 may be processes or sub-processes executed on hardware elements. However, service elements 203 and 205 may also be hardware elements or subsystems within a larger hardware system. Examples of service elements 203 and 205 include physical server machines as well as the physical hardware components contained therein. Other examples of service elements 203 and 205 include logical or software servers, applications, and processes that may run on a physical computing machine. Routers, switches, and communication links are yet more examples of service elements 203 and 205. It should be understood that a wide variety of systems and software could be considered to be service elements and the scope of the present disclosure should not be limited to the examples provided above.

Monitoring element 209 is any element capable of monitoring service element 205 for monitoring characteristics. For example, monitoring element 209 may monitor the state of hardware elements, software processes, or other aspects of the message service that may be provided by service element 205. Monitoring element 209 may also be capable of generating monitoring information corresponding to the monitored characteristics and providing the monitoring information to enhanced availability element 207.

As discussed above, examples of monitored characteristics include memory utilization, disk capacity, disk transfer rate, processor load, bandwidth, the number of processes running on a physical service element, and power consumption. Other examples include the number of messages sent and received by a service element, the size of data stores associated with the message service, as well as other characteristics related to the performance of a service element. In some cases, monitoring element 209 may also provide the monitoring information to an administrative or operational hub or system for aggregating with other monitoring information and reporting to responsible personnel.

Monitoring element 209 can be implemented within service element 205, but may also be implemented external to service element 205. It should be understood that monitoring element 209 may be a standalone element, but may be integrated within another element. Monitoring element 209 may also be part of a distributed monitoring solution involving additional monitoring elements.

Enhanced availability element 207 is any element capable of implementing enhanced availability process 100. Enhanced availability element 207 is capable of monitoring or otherwise identifying availability characteristics of at least service element 205. For example, enhanced availability element 207 may monitor the operational state of service element 205 to detect whether it is operative or inoperative. Enhanced availability element 207 is also capable of receiving monitoring information from monitoring element 209, on which it may base an availability determination with respect to service element 205, and communicating the availability to initiate an availability action.

Enhanced availability element 207 can be implemented within service element 205, but may also be implemented external to service element 205. It should be understood that enhanced availability element 207 may be a standalone element, but may be integrated within another element, or may also be part of a distributed availability solution involving additional availability elements. It should be understood that while enhanced availability element 207 and monitoring element 209 are disclosed herein as implemented separately from each other, it would be possible to implement enhanced availability element 207 and monitoring element 209 as a unified element.

In operation, enhanced availability element 207 applies process 100 to determine an availability of service element 205. In particular, enhanced availability element 207 communicates with service element 205 to monitor the availability of service element 205. This may be accomplished in a number of ways, including transmitting or exchanging ping messages with service element 205 to determine whether or not service element 205 is operative. However, it should be understood that any number of mechanisms or tools may be employed to detect availability characteristics of a service element. For example, the service element may be programmed to periodically transmit messages to enhanced availability element 207 indicative of an operative state. Absent the messages, enhanced availability element 207 may conclude that service element 205 is inoperative.

In addition, enhanced availability element 207 communicates with monitoring element 209 to obtain the monitoring information corresponding to characteristics of service element 205 monitored by monitoring element 209. This communication may be facilitated in a number of ways, such as by exchanging queries and responses between enhanced availability element 207 and monitoring element 209. Optionally, an intermediate element or elements may be involved to facilitate the communication of monitoring information from monitoring element 209 to enhanced availability element 207.

Finally, enhanced availability element 207 determines the availability of service element 205 based on the monitoring information and the availability characteristics and provides availability information to service element 203 to initiate an availability action. For example, the availability information may indicate that service element 205 is unavailable, thus triggering service element 203 to engage a different service element to provide the aspect of the message service provided by service element 205. It should be understood that enhanced availability element 207 may provide the monitoring information to elements other than or in addition to service element 203, such as another instance of an enhanced availability element.

Referring now FIG. 3, computer system 300 and the associated discussion are intended to provide a brief, general description of a computing system suitable for implementing enhanced availability process 100. Many other configurations of computing devices and software computing systems may be employed to implement enhanced availability process 100.

Computer system 300 may be any type of computing system capable of determining service element availability based on monitoring information and availability characteristics, such as a server computer, client computer, internet appliance, or any combination or variation thereof. Indeed, computer system 300 may be implemented as a single computing system, but may also be implemented in a distributed manner across multiple computing systems. Computer system 300 is provided as an example of a general purpose computing system that, when implementing enhanced availability process 100, becomes a specialized system capable of supporting high availability in message services.

Integrated availability system 300 includes processing system 301, storage system 303, and software 305. Processing system 301 is communicatively coupled with storage system 303. Storage system 303 stores software 305 which, when executed by processing system 301, directs integrated availability system 300 to operate as described for enhanced availability process 100.

Referring still to FIG. 3, processing system 301 may comprise a microprocessor and other circuitry that retrieves and executes software 305 from storage system 303. Software 305 includes enhanced availability process 100. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device.

Storage system 303 may comprise any storage media readable by processing system 301 and capable of storing software 305. Storage system 303 may include volatile and nonvolatile, removable and non-removable media implemented in any method or technology for storage of information, such as computer readable instructions, data structures, program modules, or other data. Storage system 303 may be implemented as a single storage device but may also be implemented across multiple storage devices or sub-systems. Storage system 303 may comprise additional elements, such as a controller, capable of communicating with processing system 301.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software 305 comprises computer program instructions, firmware, or some other form of machine-readable processing instructions having enhanced availability process 100 embodied therein. Software 305 may be implemented as a single application but also as multiple applications. Software 305 may be a stand-alone application but may also be implemented within other applications distributed on multiple devices.

In general, software 305 may, when loaded into processing system 301 and executed, transform processing system 301, and computer system 300 overall, from a general-purpose computing system into a special-purpose computing system customized to determine the availability of a service element based on monitoring information and availability characteristics as described for process 100 and its associated discussion.

Encoding software 305 may also transform the physical structure of storage system 303. The specific transformation of the physical structure may depend on various factors in different implementations of this description. Examples of such factors may include, but are not limited to: the technology used to implement the storage media of storage system 303, whether the computer-storage media are characterized as primary or secondary storage, and the like.

For example, if the computer-storage media are implemented as semiconductor-based memory, software 305 may transform the physical state of the semiconductor memory when the software is encoded therein. For example, integrated availability software 305 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

Referring again to FIGS. 1-3, through the operation of computer system 300 employing software 305, transformations may be performed on service element 205. As an example, service element 205 could be considered transformed from one state to another by an availability action, such as a failover operation from service element 205 to another service element, initiated by software 305 employing process 100.

Computer system 300 may have additional devices, features, or functionality. Computer system 300 may optionally have input devices such as a keyboard, a mouse, a voice input device, or a touch input device, and comparable input devices. Output devices such as a display, speakers, printer, and other types of output devices may also be included. Computer system 300 may also contain communication connections and devices that allow computer system 300 to communicate with other devices, such as over a wired or wireless network in a distributed computing and communication environment. These devices are well known in the art and need not be discussed at length here.

FIG. 4 illustrates enhanced availability environment 400 in an implementation whereby user 402 engages a message service provided by various message elements that provide the message service. FIGS. 5-6 demonstrate how enhanced availability process 100, when applied to enhanced availability environment 400, drives availability changes in different levels of the message service.

In particular, FIG. 5 and FIG. 6 illustrate the operation of enhanced availability environment 400 in a scenario whereby front-end element 431 is taken out of service, while back-end element 441 fails over to back-end element 451. As a result, service communications flow between client 401, front-end element 411, front-end element 421, and back-end element 451. FIG. 5 provides an operational sequence that illustrates how the failover to front-end element 421 is triggered based on the availability of front-end element 431. FIG. 6 provides another operational sequence that describes how the failover to back-end element 451 is triggered based on the availability of back-end element 441.

Referring now to FIG. 4, enhanced availability environment 400 includes client 401, front-end elements 411, 421, and 431, and back-end elements 441 and 451. Front-end elements 421 and 431 include monitoring elements 423 and 433 respectively. Front-end elements 421 and 431 also include enhanced availability elements (EAE) 425 and 435 respectively. Back-end elements 441 and also include monitoring elements (ME) 443 and 453 respectively, and enhanced availability elements (EAE) 445 and 455 respectively. It should be understood that additional elements and additional layers are possible within enhanced availability environment 400.

Front-end elements 411, 421, and 431 provide front-end capabilities of the message service to client 401, while back-end elements 441 and 451 provide back-end capabilities of the message service to client 401. For example, front-end element 411 may provide basic access functionality between client 401 and front-end elements 421 and 431. Front-end elements 421 and 431 may provide access functionality between client 401 and back-end elements 441 and 451. Back-end elements 441 and 451 may provide messaging functionality to client 401, such as sending, receiving, and storing messages.

Monitoring elements 423 and 433 monitor front-end elements 421 and 431 respectively for monitoring characteristics. Likewise, monitoring elements 443 and 453 monitor back-end elements 441 and 451 respectively for monitoring characteristics. For example, the health of hardware elements, software processes, or other aspects of the message service that may be provided by front-end elements 421 and 431 and back-end elements 441 and 451 may be monitored. Monitoring elements 423 and 433 generate monitoring information corresponding to the monitored characteristics and provide the monitoring information to enhanced availability elements 425 and 435 respectively. Monitoring elements 443 and 453 also generate monitoring information corresponding to the monitored characteristics and provide the monitoring information to enhanced availability elements 445 and 455 respectively.

Enhanced availability elements 425 and 435 monitor availability characteristics of front-end elements 421 and 431 respectively, while enhanced availability elements 445 and 455 monitor availability characteristics of front-end elements 441 and 451 respectively. For example, the operational state of front-end elements 421 and 431 and back-end elements 441 and 451 may be monitored to detect whether they are operative or inoperative. Enhanced availability elements 425 and 435 are also capable of receiving monitoring information from monitoring elements 423 and 433 respectively and making availability determinations based on the monitoring information. Likewise, enhanced availability elements 443 and 453 are capable of receiving monitoring information from monitoring elements 443 and 453 respectively and making availability determinations based on the monitoring information. Enhanced availability elements 424, 534, 445, and 455 may communicate the availability information to initiate available actions in response thereto, as will be discussed in more detail with respect to FIG. 5 and FIG. 6.

Illustrated in FIG. 5 is an operational sequence that may occur within enhanced availability environment 400. As discussed, monitoring element 433 provides monitoring information to enhanced availability element 435 corresponding to monitored characteristics of front-end element 431. Enhanced availability element 435 determines an availability of front-end element 431 based on monitoring information and detected availability characteristics of front-end element 431. Enhanced availability element 435 communicates the availability information front-end element 411 to initiate an availability action.

In this example, the availability action is a redirection of service communications to front-end element 421 in place of front-end element 431. Thus, when client 401 makes service requests, front-end element 411 provides service responses that direct client 401 to exchange service communications with front-end element 421.

Referring now to FIG. 6, once client 401 is directed to communicate with front-end element 431 (per the discussion associated with FIG. 5), the appropriate back-end element 441 or 451 is engaged to provide further aspects of the message service to client 401. Which back-end element 441 or 451 is the appropriate element depends upon their respective availability. The availability may be determined by enhanced availability elements 445 and 455 based on monitoring information supplied by monitoring element 443 and monitoring element 453. The availability may also be based on availability characteristics detected by enhanced availability elements 443 and 453.

In this example, enhanced availability element 445 generates availability information indicating the availability of back-end element 441. Enhanced availability element 441 provides the availability information to enhanced availability element 455 to initiate an availability action. Enhanced availability element 455 processes the availability information provided by enhanced availability element 445, along with monitoring information supplied by monitoring element 453, to arrive at an availability action. In this case, the availability action is a failover occurrence from back-end element 441 to back-end element 451. Service requests communicated by front-end element 241 are handled by back-end element 451.

It should be understood that back-end element 451 may also communicate availability information to back-end element 441 based on which back-end element may initiate an availability action. In an alternative scenario, enhanced availability element 455 communicates availability information to enhanced availability element 445. Enhanced availability element 445 then determines to retain back-end element 441 in-service based on the relative health of back-end element 441 compared to that of back-end element 451. Accordingly, front-end element 441 is directed to exchange service communications, such as service requests and responses, with back-end element 441 to provide the message service to client 401.

FIG. 7 illustrates enhanced availability environment 700 in which an exemplary message service is provided to message client 703 running on client device 701. In this implementation, the message service is an email service and is provided by entry servers 713 and 715, and multi-role systems 721, 731, and 741. An example of a message service is Microsoft® Exchange. Network load balancer 711 provides load balancing functionality across entry servers 713 and 715 based on their relative availability as determined by integrated availability elements (IAE) 714 and 716, as will be discussed in more detail below. It should be understood that other service architectures are possible and the scope of the present disclosure should not be limited to the particular architecture disclosed herein.

Entry servers 713 and 715 direct session communications to multi-role systems 721, 731, and 741 based on a number of factors, including their respective availability as determined by integrated availability elements (IAE) 727, 737, and 747 respectively, as will also be discussed in more detail below. Entry servers 713 and 715 may provide various front-end aspects of the email service, such as perimeter security and proxy services. Other front-end roles and functionality are possible and should be considered within the scope of this disclosure.

Multi-role systems 721, 731, and 741 include messaging servers 723, 733, and 743 respectively, which each provide various back-end aspects of the email service, such as protocol functionality and transport hub functionality. Multi-role systems 721, 731, and 741 also include content servers 725, 735, and 745 respectively, which may provide additional back-end aspects of the email service, such as mailbox and data protection functions. It should be understood that the roles provided multi-role systems 721, 731, and 741 are not limited to just those disclosed herein, but could encompass other servers, functions and roles.

Integrated availability elements 714, 716, 727, 737, and 747 include monitoring elements and enhanced availability elements, as illustrated for integrated availability element 747 by monitoring element (ME) 789 and enhanced availability element (EAE) 787. Integrated availability elements 714, 716, 727, 737, and 747 monitor the health of the various components of multi-role systems 721, 731, and 741, as well as the availability of the various components. In addition, integrated availability elements 714, 716, 727, 737, and 747 may communicate with each other to initiate availability actions based on the availability of the systems and subsystems that provide the email service.

In FIG. 7, two scenarios are provided to illustrate the application of enhanced availability process 100 to an email service. First, an out-of-service scenario is depicted whereby entry server 713 is taken out of service based on its availability. Secondly, a failover scenario is depicted whereby multi-role system 721 fails over to multi-role system 731. In both scenarios, the availability action is an availability action initiated as a result of an integrated availability element performing process 100. In other words, both monitored characteristics and availability characteristics of the service elements involved in providing the email service are considered when determining the availability of entry server 713 and multi-role system 721.

As illustrated in FIG. 7, messaging client 703 exchanges service communications with network load balancer 711. For example, message client 703 may request access to the email service. In response, network load balancer 711 identifies an appropriate entry server to handle an instance of the email service with messaging client 703. Which entry server is selected is based at least partly on the availability of each of entry server 713 and 715. Should one of the entry servers be unavailable, then that entry server would be taken out of rotation and the other entry server utilized for messaging sessions.

In this scenario, entry server 713 includes integrated availability element 714 running thereon that monitors both monitoring characteristics and availability characteristics of entry server 713 to determine its availability. Similarly, entry server 715 includes integrated availability element 716 running thereon to monitor both monitoring characteristics and availability characteristics of entry server 715. Integrated availability elements 714 and 716 generate and exchange availability information with each other to initiate an availability action.

The availability action may take any number of forms depending upon the availability of each entry server 713 and 715, such as taking an entry server out of rotation, attempting a recovery of an entry server or sub-system therein, or maintaining the present state of the entry server. In other words, making no change to the configuration of the email service may itself be considered an availability action. Integrated availability elements 714 and 716 may be capable of determining the specific availability action to initiate, but network load balancer 711 may also be capable of performing this function.

In this example, the availability action is determined by each entry server individually, but is based on the availability of both entry servers. For example, integrated availability element 714 may communicate to decide to take entry server 713 out of rotation only if the availability of entry server 713 indicates a performance level worse than that indicated by the availability of entry server 713 as communicated by integrated availability element 716. Likewise, integrated availability element 716 may decide to take entry server 715 out of service only if the availability of entry server 715 is worse than that of entry server 713 as communicated by integrated availability element 714. It should be understood that integrated availability element 714 is capable of initiating an availability action with respect to entry server 715 too, such as taking entry server 715 out of service. Likewise, integrated availability element 716 is capable of initiating an availability action with respect to entry server 713.

Optionally, network load balancer 711 may determine the appropriate availability action to take in response to the relative availability of entry servers 713 and 715 communicated by integrated availability elements 714 and 716. For instance, integrated availability element 714 may communicate only the availability of entry server 713 or entry server 715, or both, network load balancer 711. Likewise, integrated availability element 716 may communicate the availability of entry server 715, or entry server 713, or both, to network load balancer 711. Network load balancer 711 can then determine the appropriate action to take in response to the relative availability of entry servers 713 and 715, such as taking one or the other entry server out of service, initiating a recovery action, restoring an entry server to the message service, or any combination or variation thereof.

In this scenario, it is assumed for illustrative purposes that entry server 713 is unavailable and that a determination has been made to take entry server 713 out of service. Thus, network load balancer 711 routes service communications to entry server 715. Entry server 715 is then responsible for engaging one of multi-role systems 721, 731, and 741 to handle service communications. Generally, the multi-role system that hosts the active message database for a given user is the multi-role system engaged by entry server 715. However, which multi-role system hosts the active database is itself determined based on a number of factors, including the availability of each multi-role system.

With respect to FIG. 7, the availability of each of multi-role systems 721, 731, and 741 is determined by integrated availability elements 727, 737, and 747. Each integrated availability element 727, 737, and 747 determines the availability of each multi-role system 721, 731, and 741 respectively based on monitored characteristics of the multi-role systems and availability characteristics. Integrated availability elements 727, 737, and 747 than inform each other of the availability of their respective multi-role systems in order to initiate an availability action. For example, any of integrated availability elements 727, 737, and 747 may initiate an availability action with respect to any of the multi-role systems 721, 731, and 741, such as initiating a failover of service from one multi-role system to another.

In this example, it is assumed that multi-role system 721 had initially hosted the active message database for user 702. However, during operation integrated availability element 727 may be reported an availability of multi-role system 721 that triggered a failover scenario to occur to multi-role system 731. Thus, inactive database 729 is identified as inactive while multi-role system 721 is out of service, while active database 739 is identified as the active database for user 702. Passive database 749 provides a passive database role supporting the replication of active database 739

Having been associated with the active database for user 702, multi-role system 731 is identified to entry server 715 as the appropriate multi-role system for the instance of the message service provided to messaging client 703. This may be accomplished in a number of ways, including entry server 715 making a service request to any of integrated availability elements 727, 737, and 747 to identify the appropriate multi-role system. For example, in addition to determining and tracking the availability of the multi-role systems, integrated availability elements 727, 737, and 747 may also track the association of active database with multi-role systems. Any of integrated availability elements 727, 737, and 747 can provide a service response to entry server 715 identifying multi-role system 731. Alternatively, entry server 715 may make a service request of some other service element or elements that track which multi-role system presently hosts the active message database for a particular user.

Regardless, multi-role system 731 is ultimately identified to entry server 715 as the appropriate system with which to communicate. As such, service communications are exchanged between entry server 715 and multi-role system 731 to facilitate the message service for messaging client 703.

FIG. 8 illustrates another enhanced availability process 800 that may be implemented within any of aforementioned enhanced availability environments 200, 400, and 700, using a suitable computing system, such as computer system 300. To begin, an availability characteristic of a service element is analyzed (step 801). Next, the service element is determined to be operative or inoperative based on the analyzed availability characteristic (step 803). If the service element is determined to be inoperative, then the unavailability of the service element is communicated to other elements to initiate an appropriate availability response (step 805).

If the service element is determined to be operative, then monitoring information is analyzed pertaining to monitored characteristics of the service element (step 807). Next, the service element is determined to be available or unavailable based on the monitoring information (step 809). If the service element is determined to be unavailable, then process 800 returns to step 805 whereby its unavailability is communicated to other elements to initiate an appropriate availability response. If the service element is determined to be available, then the availability of the service element is communicated as such (step 811). Appropriate availability action can also be taken in response to the available status of the service element.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
a storage device;
a processing system operatively coupled with the storage device; and
program instructions stored on the storage device for implementing an enhanced availability process in a message service provided by a plurality of service elements, wherein the program instructions, when executed by the processing system, direct the-processing system to:
receive monitoring information corresponding to a monitored characteristic of a first service element of the plurality of service elements, wherein the monitoring information indicates a health status of the first service element;
determine a granular level of availability of the first service element for the message service based at least in part on the monitoring information, the granular level of availability is represented as a numeric scale corresponding to the availability of the first service element;
determine an availability of the first service element for the message service based at least in part on the granular level of availability and an availability characteristic pertaining to an operational state of the first service element; and
communicate the availability of the first service element to initiate an availability action, wherein the availability action comprises a determination of an availability of another service element for the message service based on the determined availability of the first service element;
wherein the plurality of service elements comprises a plurality entry servers and at least one network load balancer, wherein the first service element comprises one of the plurality of entry servers and wherein a second service element comprises the network load balancer.

2. The computing apparatus of claim 1 wherein to determine the availability of the first service element the program instructions, when executed by the processing system, direct the processing system to:
process the availability characteristic to determine whether the first service element is operative or inoperative;
in response to a determination that the first service element is operative, process the granular level of availability to determine if the first service element is available or unavailable.

3. The computing apparatus of claim 2 wherein to communicate the availability of the first service element the program instructions, when executed by the processing system, direct the processing system to communicate to the second service element whether the first service element is available or unavailable.

4. The computing apparatus of claim 3 wherein the availability action comprises removal of the first service element from the message service when the first service element is unavailable.

5. The computing apparatus of claim 4 wherein the program instructions, when executed by the processing system, further direct the processing system to direct service communications to a failover service element of the plurality of service elements in place of the first service element.

6. The computing apparatus of claim 3 wherein the message service comprises an email service.

7. The computing apparatus of claim 1 wherein to receive the monitoring information the program instructions, when executed by the processing system, direct the processing system to receive the monitoring information from a monitoring element.

8. An enhanced availability environment for facilitating a message service provided by a plurality of service elements, the enhanced availability environment comprising:
- a monitoring element, executed by at least one processor, configured to monitor a first service element of the plurality of service elements for a monitored characteristic, generate monitoring information corresponding to the monitored characteristic, and communicate the monitoring information to an enhanced availability element, wherein the monitoring information indicates a health status of the first service element; and
- the enhanced availability element, executed by the at least one processor, configured to:
- determine a granular level of availability of the first service element for the message service based at least in part on the monitoring information, the granular level of availability is represented as a numeric scale corresponding to the availability of the first service element;
- determine an availability of the first service element for the message service based at least in part on the granular level of availability and an availability characteristic pertaining to an operational state of the first service element; and
- communicate the availability to initiate an availability action;
- wherein the plurality of service elements comprises a plurality messaging servers, wherein the first service element comprises one of the plurality of messaging servers and wherein a second service element comprises another one of the plurality of messaging servers.

9. The enhanced availability environment of claim 8 wherein to determine the availability of the first service element, the enhanced availability element when executed by the at least one processor is configured to process the availability characteristic to determine whether the first service element is operative or inoperative, and in response to a determination that the first service element is operative, process the granular level of availability to determine if the first service element is available or unavailable.

10. The enhanced availability environment of claim 9 wherein to communicate the availability of the first service element, the enhanced availability element when executed by the at least one processor communicates to the second service element whether the first service element is available or unavailable.

11. The enhanced availability environment of claim 10 wherein the availability action comprises a removal of the first service element from the message service when the first service element is unavailable.

12. The enhanced availability environment of claim 8 wherein the availability action comprises a designation of a passive message database hosted by a failover service element as an active message database in place of a previously active message database hosted by the first service element.

13. A method of operating an enhanced availability element to facilitate a message service provided by a plurality of service elements, the method comprising:
- receiving monitoring information corresponding to a monitored characteristic of a first service element of the plurality of service elements, wherein the monitoring information indicates a health status of the first service element;
- determining a granular level of availability of the first service element for the message service based at least in part on the monitoring information, the granular level of availability is represented as a numeric scale corresponding to the availability of the first service element;
- determining an availability of the first service element for the message service based at least in part on the granular level of availability and an availability characteristic pertaining to an operational state of the first service element by at least processing the availability characteristic to determine whether the first service element is operative or inoperative and, in response to determining that the first service element is operative, processing the granular level of availability to determine if the first service element is available or unavailable; and
- communicating the availability of the first service element to initiate an availability action;
- wherein the plurality of service elements comprises a plurality entry servers and at least one network load balancer, wherein the first service element comprises one of the plurality of entry servers and wherein a second service element comprises the network load balancer.

14. The method of claim 13 wherein the message service comprises an email service.

15. The method of claim 14 wherein communicating the availability of the first service element comprises communicating to the second service element whether the first service element is available or unavailable.

16. The method of claim 15 wherein the availability action comprises removing the first service element from the message service when the first service element is unavailable, and wherein the method further comprises directing service communications to a failover service element of the plurality of service elements in place of the first service element.

17. The method of claim 13 wherein receiving the monitoring information comprises receiving the monitoring information from a monitoring element.

18. The enhanced availability environment of claim 8, wherein the message service comprises an email service.

19. The computing apparatus of claim 1, wherein the granular level of availability is represented as a numeric scale corresponding to the availability of the first service element.

20. The method of claim 13, wherein the availability action comprises a determination of an availability of another service element for the message service based on the determined availability of the first service element.

* * * * *